United States Patent [19]

Anastasia

[11] 4,336,567
[45] Jun. 22, 1982

[54] DIFFERENTIAL PRESSURE TRANSDUCER

[75] Inventor: Harry G. Anastasia, Hillsdale, N.J.

[73] Assignee: The Bendix Corporation, Teterboro, N.J.

[21] Appl. No.: 164,758

[22] Filed: Jun. 30, 1980

[51] Int. Cl.³ .............................................. G01L 9/12
[52] U.S. Cl. ...................................... 361/283; 73/718
[58] Field of Search ........................ 73/718, 724, 716; 361/283

[56] References Cited

U.S. PATENT DOCUMENTS

| 4,177,680 | 12/1979 | Coleman | 73/718 |
| 4,178,621 | 12/1979 | Simonelic et al. | 73/718 |
| 4,196,632 | 4/1980 | Sikorra | 73/718 |
| 4,244,228 | 1/1981 | Lehnhardt | |
| 4,288,835 | 9/1981 | Lee et al. | 73/718 |

Primary Examiner—Donald O. Woodiel
Attorney, Agent, or Firm—Markell Seitzman; Anthony F. Cuoco

[57] ABSTRACT

A differential pressure transducer having a central support structure separating two flexible diaphragms. The support structure has a central hole and the diaphragms are joined on their opposing surfaces at their respective centers by a post that is loosely received through the hole. The central structure and each diaphragm are separated by an annular sealing ring that is preferably fabricated from a glass frit having characteristics similar to the material used for the diaphragms and central structure. The transducer further includes a plurality of electrodes located on one surface of the central support member and a third electrode, located on the inner surface of one of the diaphragms, therein forming the electrodes of a pressure sensing capacitor and a reference capacitor. The transducer further includes a fourth electrode located on the inner surface of the opposing diaphragm wherein the fourth electrode is electrically connected to the third electrode to provide a means for shielding capacitive measurements from stray magnetic and electrical fields.

24 Claims, 5 Drawing Figures

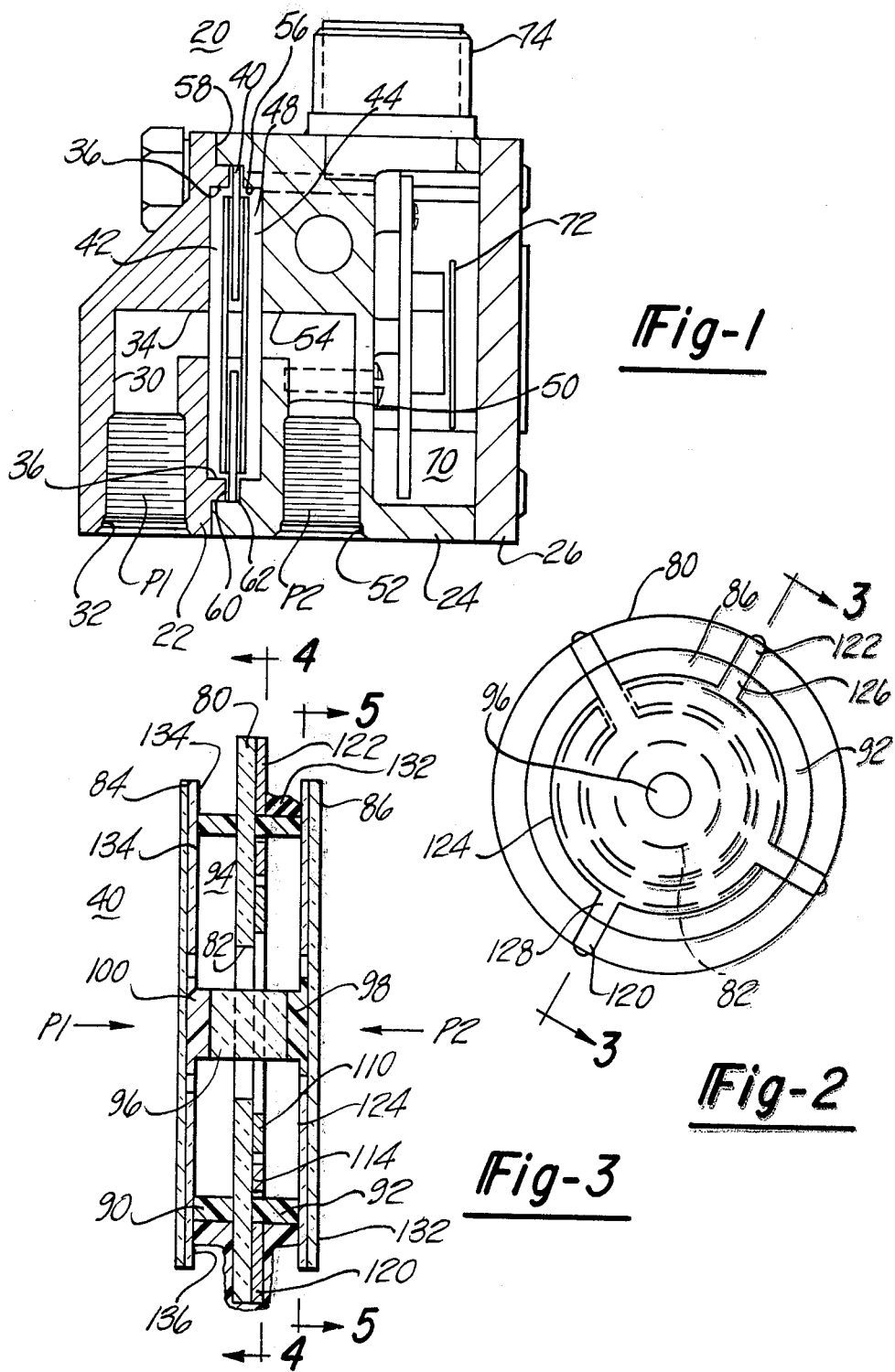

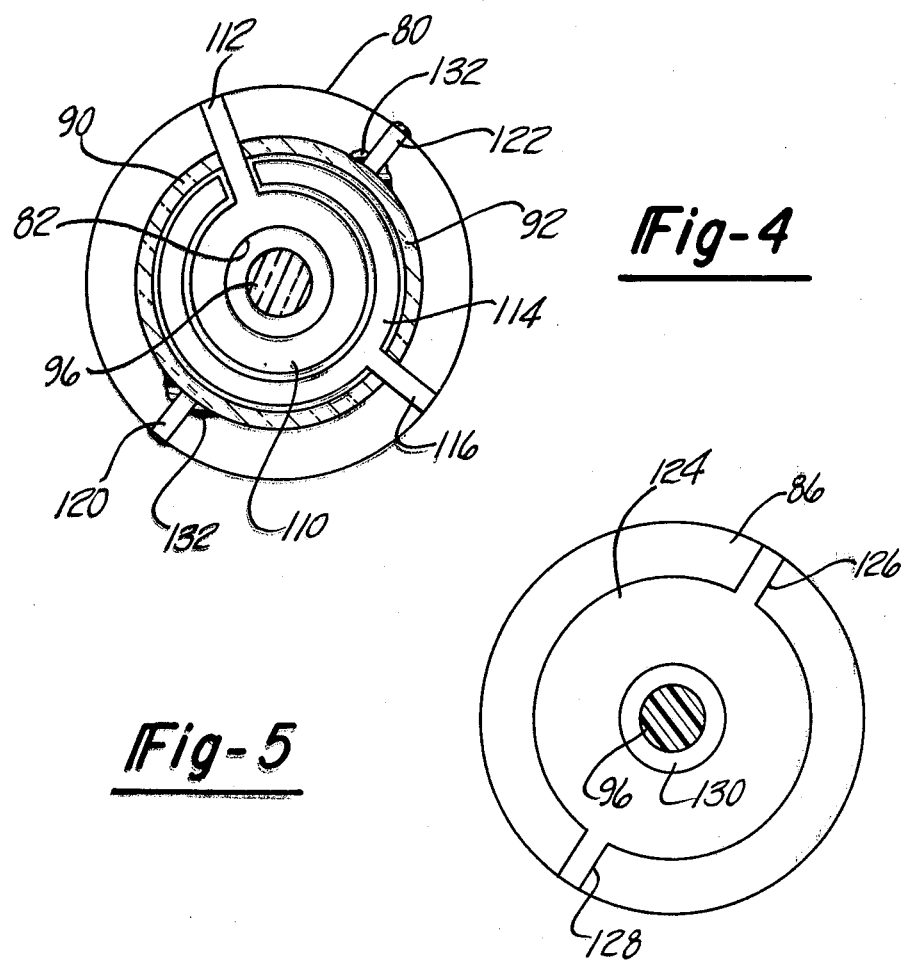

DIFFERENTIAL PRESSURE TRANSDUCER

BACKGROUND AND SUMMARY OF THE INVENTION

Capacitive pressure sensors are known in the art. These sensors comprise at least one flexible diaphragm having a metalized portion thereon forming one electrode of a pressure sensing capacitor that is movable with respect to a second electrode. It is often the case that the second electrode comprises another metalized portion on a second flexible diaphragm. The capacitance of the sensor is directly related to the dielectric constant of the material in the gap separating the two or more capacitive plates. Undesirable or unaccounted for changes in the dielectric constant of the material within the capacitance gap effects the accuracy and the repeatability of the capacitance measurements. Capacitance sensing units often separate flexible diaphragms from other parts of the sensor by a spacer which serves to seal the volume therebetween therein isolating this volume from the changeable characteristics of the media whose pressure is being sensed. To obtain a dielectric constant that is relatively stable, in the presence of changeable pressure and temperature conditions, the prior art has filled the capacitance gap with a material such as silicon oil. Silicon oil is chosen because its viscosity is nearly constant over a wide temperature range, however, when precise measurements are required, silicon oil is not totally satisfactory. In addition, those pressure sensors which utilize a fluid as a dielectric material display a sluggishness in their measurement characteristics arising from the mass of fluid which must be moved. In addition, other transient measurement errors will be introduced when the sensor is placed in an accelerating environment. These transient measurement errors are amplified when the pressure sensor is used in a hostile aircraft environment which is subjected to high levels of rotational and longitudinal acceleration as well as high levels of aircraft vibration.

It is an object of the present invention to accurately measure pressure. An advantage of the present invention is that the differential pressure transducer produces a capacitive signal reflective of the pressures to be measured and that this signal is immune from undesirable changes in the dielectric constant of the pressure media. In addition, the electrodes and dielectric gap of the capacitor are isolated from the pressure media. Contaminatative and corrosive actions on the electrodes and electrical effects of conductive particle precipitates are thereby avoided.

The present invention relates to a differential pressure sensor comprising a chamber that is adapted to communicate with a first and second source of pressure to be measured. The sensor comprises a central support member circumferentially supported about the chamber for dividing the chamber into smaller first and second pressure receiving chaambers so that the first and second chambers communicate with the first and second pressure sources. The central support member comprises a substantially flat member having peripheral dimensions comporting with the interior dimensions of the chamber and further having a hole therein. The sensor further includes a first flexible diaphragm having a pressure responsive region thereon. The first diaphragm is preferably coaxially oriented relative to the center of the central support member. The first diaphragm is mounted in a parallel spaced apart alignment relative to a first side of the central support member. The sensor further includes a second flexible diaphragm oriented and mounted to the other side of the support member. The first and second diaphragms are mounted to the central support member by a peripheral glass frit seal to hermetically seal the diaphragms to the central support member. The pressure sensor further includes a spacer such as a post received through the hole in the central support member to join the interior, opposing surfaces of the two flexible diaphragms. In this manner, the deflections of both diaphragms are dependant and proportional to the pressure differential thereacross. In addition, the pressure transducer contains a plurality of electrodes deposited to the central support member and to the diaphragms for establishing the electrodes and ground shield of a pressure responsive capacitor. In one embodiment, the transducer utilizes two substantially annular coaxially situated electrodes deposited to the central support member about the hole. The central support member further includes a pair of radial leads partially extending from the location of the peripheral glass seal to the edge of the support member. Each flexible diaphragm comprises a disc having smaller dimensions than the central support member and further including an annular electrode have radially extending leads. During manufacture, the radial extending leads of the diaphragms are oriented in vertical alignment relative to the partial extending leads located on the central support member. Since the partial radially extending leads extend beyond the corresponding leads located on the underside of the flexible diaphragms, the electrical connection to the electrodes located on the undersides of the diaphragm is conveniently accessible through the partial leads.

Many other objects, purposes and advantages of the invention will be clear from the detailed description of the drawings.

BRIEF DESCRIPTION OF THE DRAWINGS

In the drawings:

FIG. 1 is a cross-sectional view of a housing for a differential pressure transducer having a pressure capsule therein.

FIG. 2 is a top plan view of the pressure capsule as viewed from a high pressure receiving side of the housing.

FIG. 3 is a cross-sectional view of the pressure capsule taken through Section 3—3 of FIG. 2.

FIG. 4 is a sectional view illustrating the relationship between the central support member and the electrodes deposited thereon.

FIG. 5 is a plan view illustrative of either of the diaphragms.

DETAILED DESCRIPTION OF THE DRAWINGS

Reference is made to FIG. 1 which illustrates a cross-sectional view of pressure sensor 20. Pressure sensor 20 comprises a multisection housing comprising a number of interfitting sections such as sections 22, 24 and 26. Housing section 22 contains a passage 30 having at one end an input port 32 adapted to receive a pressure ($P_1$) to be measured. Housing section 22 further includes an intersecting passage 34 connected to the other end of passage 30 and a relatively shallow countersunk bore 36. As will be seen below, the housing 22, in particular bore 36, cooperates with a pressure capsule 40 to establish a first pressure receiving cavity 42. In a similar manner the middle housing section 24 contains passage 50, having at one end, an input port 52, adapted in an known manner to receive a pressure ($P_2$) to be measured. As an example $P_1$ may be vented to atmosphere and $P_2$ connected to a higher pressure level source. Housing section 24 further includes an intersecting passage 54 connecting the other end of passage 50 with a relatively narrow countersunk bore 56. The bore 56 and the other side of capsule 40 cooperate to establish the second pressure receiving cavity 44. Housing sections 22 and 24 are adapted to mate in a known manner forming a pressure tight seal therebetween at the respective mating surfaces 58. In addition, housing sections 22 and 24 cooperate to provide a circumferential pair of shoulders 60 and 62 that are adapted to support and hold a cooperating portion of capsule 40. The interrelationship between capsule 40 and the shoulders 60 and 62 are described below.

Housing sections 24 and 26 cooperate to define another cavity 70 that may be used to house associated electronics which communicate signals between connector 74 to appropriate electronic terminals on the pressure sensor 40.

In operation, the pressures $P_1$ and $P_2$ are communicated via ports 32 and 52, to the respective pressure receiving cavities 42 and 44 that are adjacent to the pressure receiving surfaces of the capsule 40. In response to the differential in the magnitude of pressure levels applied thereto the capsule 40 in conjunction with the electronics 72 generates capacitive signals indicative of the pressures and/or pressure differential being sensed.

Reference is now made to FIGS. 2 and 3 which illustrate respectively a top plan view of the high pressure receiving surface of capsule 40 and a cross-sectional view taken through section lines 3—3 of FIG. 2. The capsule 40 comprises a central support 80 having the opening 82 therethrough. More particularly, support 80 is sized to be received between the shoulders 60 and 62 of housing sections 22 and 24, respectively (see FIG. 1). The central support 80 may be joined to the respective housing sections by gaskets, o-rings or an aerospace type adhesive such as Dow Corning sealant 3145. The support 80 is preferably fabricated of a material having a substantially zero hysteresis characteristic and a low thermal coefficient of expansion. Materials of this type include alumina, Pyrex and, as implemented in the preferred embodiment, fused quartz. While the preferred embodiment of the invention utilizes a central circular support 80 comporting with the substantially circular shape of shoulders 60 and 62 other geometric shapes are workable. The capsule 40 further includes two smaller discs comprising the flexible diaphragms 84 and 86. In the preferred embodiment the diaphragms 84 and 86 and hole 82 are situated coaxially to the center of support 80. More specifically, the diaphragms 84 and 86 are maintained in a spaced apart parallel relationship relative to one another and to the central support 80 by a pair of peripheral seals such as the annular glass frit seals 90 and 92. These seals 90 and 92 may be deposited in any known manner including: silk screening, vacuum deposition and/or sputtering.

It is preferable to fabricate the central support 80 to be more rigid than the diaphragms 84 and 86 and to fabricate the diaphragms 84 and 86 and support 80 from the same material. In addition, the mechanical characteristics of the sealing material should be similar to that of the diaphragms 84, 86 and support 80. One typical sealing glass that may be used that joins fused quartz is Glass Transfer Tape G1015 manufactured by the Vitta Corporation of Danbury Connecticut.

As an example one configuration of the invention utilizes a circular support 80 that has a 1.8 inch diameter and is 0.093 inches thick; each diaphragm is circular and has a diameter of 1.5 inches and is of 0.086 inches thick. The typical spacing between the members 80, 84 and 86 may vary from 0.5 milli-inch to perhaps 20 milli-inches while a spacing of 0.8 milli-inch has been chosen for the preferred embodiment. The annular glass frit seals 90 and 92 are maintained in parallel alignment one to the other and are preferably coaxially situated relative to the center of the support 80. The diaphragms 84 and 86, the frit seals 90 and 92 and the support 80 cooperate to provide a hermetically sealed chamber 94 having located therein a plurality of electrodes. The orientation and interrelationship of these electrodes is discussed below. The pressure capsule 40 further includes a central spacer, link or post 96, that is received through opening 82. The post 96, in the preferred embodiment, is coaxially oriented relative to the centers of diaphragms 84 and 86 and is joined to the diaphragms by a pair of frit-like seals 98 and 100. The length of post 96 and the thicknesses of the seals 98 and 100 are controlled such that the diaphragms 84 and 86, absent pressure applied thereto, are maintained in a substantial unstressed relationship. Reference is made to FIGS. 4 and 5 which illustrate the relationship between a plurality of electrodes, the support 80 and diaphragms 84 and 86. More specifically FIG. 4 is a top view of the electrodes taken through section 4—4. The central support 80 contains a centrally located annular electrode 110 which surrounds the opening 82. A radially situated lead 112 connects electrode 110 with the peripheral edge of the support 80. The support 80 further includes a second substantially annular, C-shaped, electrode 114 partially encircling electrode 110. A radial lead 116 connects electrode 114 with the peripheral edge of support 80. The radial leads 112 and 116 may be positioned 180 degrees apart from one another or at other angles as illustrated in FIG. 4. The inner electrode 110 is placed on the support 80 at a location adjacent to a pressure responsive region of the diaphragm 86. Electrode 110 and the electrode 124 on diaphragm 86, see FIG. 5, form a pressure sensing capacitor $C_s$. The outer electrode 114 is located on support 80 in an area corresponding to a region of less deflection of diaphragm 86, i.e., at the outer extremes of the diaphragm's pressure responsive region and cooperates with the electrode 124 of diaphragm 86 to form a reference capacitor $C_r$. While it is preferable to expose the $C_s$ and $C_r$ to the same environment this is not a requirement of the present invention, consequently $C_r$ need not be implemented within the capsule 40. Alternatively, the capsule electrodes may be so configured so as to form a plurality pressure sensing capacitors formed between both diaphragms 84 and 86 rather than between the support 80 and diaphragm 86. Alternatively the support 80 may have deposited thereon, on its opposing side, a plurality of electrodes to form additional pressure sensing and reference capacitor. The support 80 further includes a pair of partial leads 120 and 122 that extend along radii from a dimension slightly greater than the radius of the frit 92 to the outer edges of the support 80. The partially extending radial leads 120 and 122 can be situated 90 degrees from the lead 116. Reference is now made to FIG. 5 which illustrates a plan view of a diaphragm 86 having a centrally located annular ground electrode 124 with radially extending leads 126 and 128. Diaphragm 86 includes a circular nonmetalized portion 130 which is sized to accommodate the seal 98 and post 96. The diaphragm 86 is sized so that when it is placed coaxially over the center of the support 80 the electrode 124 covers the interior portion of electrode 110 and extends slightly beyond the exterior dimension of electrode 114. In this manner the ground electrode 124 effectively shields the pressure sensing capacitor electrode 112 and the less sensitive reference capacitor electrode 114. In addition, the diaphragm 86 is sized such that leads 126 and 128, respectively when aligned relative to the radial lead 116 partially overlap the leads 120 and 122. This construction permits leads 126 and 128 which are located on the underside of diaphragm 86 to be connected to the leads 122 and 120 which extend to the edges of the larger central disc of support 80 therein permitting easy access to connect electrode 124 to ground potential. One method of connecting leads 126 and 128 to leads 122 and 120, is during manufacture, to deposit a small quantity of a conductive paste material such as a gold-platinum paste 132 to the electrodes 120 and 122; by heating the paste a permanent connection is achieved.

Reference is again made to FIG. 3. The capsule 40 further includes a second flexible diaphragm 84. The diaphragm 84 contains a second circular shielding electrode 134 which is identical to electrode 124 of diaphragm 86 as shown in FIG. 5 and further includes radially extending leads 134 and 136. During manufacture the leads 126, 128, 134 and 136 are aligned and maintained in vertical stacked alignment. By heating and curing the paste 132 a permanent electrical connection is established therebetween. To shield the capsule 40 from stray magnetic electrical fields it is desirable to connect both electrodes 124 and 134 to ground.

Many changes and modifications in the above-described embodiment of the invention can, of course, be carried out without departing from the scope thereof. Accordingly, the scope is intended to be limited only by the scope of the appended claims.

What is claimed is:

1. A pressure sensing capsule comprising:
    a central member having first and second opposing sides and an opening therethrough;
    first diaphragm means spaced from said first side and having a first pressure receiving surface thereon that is deformable in response to the pressure of a first media input thereto;
    first annular sealing means interposing said first side and said first diaphragm means, and located in surrounding relationship to said opening for peripherially sealing said first diaphragm means to and for spacing said first diaphragm means from said central member;
    second diaphragm means spaced from said second side and having a second pressure receiving surface thereon that is deformable in response to a second media input thereto;
    second annular sealing means, interposing said second side and said second diaphragm means and located in surrounding relationship to said opening for peripherally sealing said second diaphragm means to said second side of said central member;
    electrode means attached to said central member and one of said first or second diaphragm means for transducing the pressure to be measured into a capacitive signal; and
    first means slidably received through said opening for causing the motion of one diaphragm to be dependent upon the motion of the other.

2. The capsule as recited in claim 1 wherein said first means includes joining means for joining a portion of said first and second diaphragms together.

3. The apparatus as recited in claim 2 wherein said first means, said first diaphragm means, and said second diaphragm means are fabricated from an electrically insulative, elastic material having low hysteresis characteristics.

4. The apparatus as recited in claim 3 wherein said central member, said first diaphragm means and said second diaphragm means are flat discs.

5. The apparatus as recited in claim 4 wherein said electrode means is isolated from the pressure environment to be measured.

6. The apparatus as recited in claim 5 wherein said discs are fabricated of fused quartz.

7. The apparatus as recited in claim 6 wherein the volume between said first and said diaphragm means is evacuated.

8. A capacitive pressure sensor comprising:
    a chamber adapted to receive first and second pressures to be measured;
    first means, having first and second sides and an opening therethrough for dividing said chamber into two smaller pressure receiving chambers and wherein the edges of said sides substantially conformed to the dimensions of and are adapted to be attached to the interior portions of said chamber;
    second means, having a pressure sensitive region thereon, for deforming in response to said first pressure applied thereto;
    first mounting means for sealing said second means to and for mounting said second means apart from said first side wherein said pressure sensitive region covers said opening;
    third means, having a pressure sensitive region thereon, for deforming in response to said second pressure applied thereto;
    second mounting means for sealing said third means to and for mounting said third means apart from said second side wherein said pressure sensitive region is located in parallel alignment with the pressure sensitive region of said first means;
    joining means of substantially the same material as said second and third means, slidably received through said opening and located in connecting engagement with the undersides of said pressure sensitive regions for spacing said second and third means apart and for jointly moving said second and third means relative to said first means in response to pressure applied thereto; and
    capacitor means attached to said second or third means and said first means for establishing the electrodes of a pressure variable capacitor.

9. The transducer as recited in claim 7 wherein said first means does not deform in response to the received pressures.

10. The transducer as recited in claim 7 wherein said hole is coaxially situated relative to the center of said first means.

11. The transducer as recited in claim 10 wherein said first means, second means, third means and joining means are fabricated from an electrically insulative, elastic material having low hysteresis characteristics.

12. The transducer as recited in claim 11 wherein said material is fused quartz.

13. The transducer as recited in claims 11 or 12 wherein said electrodes are isolated from the environment to be measured.

14. A pressure sensitive capacitor comprising:
a pair of flexible spaced apart diaphragms, that are deformable in response to pressure applied thereto;
electrode means attached to and deformable with at least one of said diaphragms for forming the electrodes of a capacitor;
sealing means interposing said diaphragms for spacing said diaphragms apart and for hermetically sealing and isolating said electrode means from the pressure environment to be measured:
non-viscous joining means located within the sealed volume and attached to said opposing surfaces for coupling the motion of one diaphragm to the other diaphragm; and
contact means for communicating the capacitance of said electrodes to electric circuits external to said capacitor.

15. The apparatus as recited in claim 14 wherein said joining means and said diaphragms are manufactured of the same material.

16. The apparatus as recited in claim 15 wherein said material is an electrically insulative, elastic material having low hysteresis characteristics.

17. The apparatus as recited in claim 16 wherein said sealing means comprises:
a first member, being more rigid than said diaphragms, and situated between said diaphragms, and having an opening therethrough for slidably receiving said joining means; and
peripheral seal means for sealing each of said diaphragms near its periphery to said first member.

18. The apparatus as recited in claim 17 wherein said first means, said diaphragms and said joining means are manufactured of fused quartz and wherein said peripheral seal means includes an annular glass seal having physical characteristics similar to that of fused quartz.

19. A pressure sensor comprising:
a chamber adapted to receive first and second pressures to be measured;
a flat first member, being substantially rigid and fabricated from an electrically insulative, material having low hysteresis, said member having a centrally located hole therethrough wherein the size of said member comports with the size of the interior of said chamber such that said chamber and said member cooperate to separate said chamber into two smaller pressure receiving chambers to receive first and second pressure;
a pair of flat circular diaphragms mounted in parallel and coaxial relationship with respect to each side of said member, each diaphragm deflectable in response to said first and second pressures, and wherein said diaphragms are smaller than said member;
a seal means for spacing said diaphragms apart from said member, for sealing said diaphragms to said member and for establishing a hermetically sealed volume therebetween;
a non-flexible post, fabricated of the same material as said diaphragms, slidably received through said hole and attached to portions of the sides of each diaphragm adjacent said sealed volume;
at least one electrode disposed on a side of one of said diaphragms within said sealed volume, and having at least one electrical lead extending beyond said seal means;
at least one other electrode disposed opposite said one electrode, within said sealed volume, on one side of said member, said other electrode having an electrical lead extending beyond said seal means toward the periphery of said first member;
said first member further including at least one radially extending partial lead located outside of said sealed volume and situated in vertical alignment with said at least one electrical lead on said diaphragm;
means for electrically joining said partial lead to said at least one electrical lead on said diaphragm.

20. The apparatus as recited in claim 19 further including:
shielding means disposed on the other one of said diaphragms and electrically connected to said partial lead for shielding said apparatus from stray electrical fields.

21. The apparatus as recited in claim 20 wherein said shielding means includes said other diaphragm having a metalized layer of material thereon.

22. The apparatus as recited in claim 21 wherein said metalized layer is situated substantially within said sealed volume.

23. The apparatus as recited in claims 19 or 22 wherein said radially extending partial lead and said electrical lead of said other electrode are disposed ninety degrees to one another.

24. The apparatus as recited in claim 23 wherein said first member, said diaphragms and said post one fabricated from fused quartz.

* * * * *